US009342498B2

(12) United States Patent
McNaught

(10) Patent No.: US 9,342,498 B2
(45) Date of Patent: May 17, 2016

(54) SYSTEM AND METHOD FOR GENERATING A DESIGN TEMPLATE BASED ON GRAPHICAL INPUT

(71) Applicant: SYNERGY PLATFORM PTY LTD, Brendale (AU)

(72) Inventor: Scott David McNaught, Warner (AU)

( * ) Notice: Subject to any disclaimer, the term of this patent is extended or adjusted under 35 U.S.C. 154(b) by 36 days.

(21) Appl. No.: 14/303,293

(22) Filed: Jun. 12, 2014

(65) Prior Publication Data

US 2015/0363380 A1    Dec. 17, 2015

(51) Int. Cl.
*G06F 17/24* (2006.01)
*G06F 17/30* (2006.01)
*G06F 17/22* (2006.01)

(52) U.S. Cl.
CPC .......... *G06F 17/248* (2013.01); *G06F 17/2247* (2013.01); *G06F 17/30896* (2013.01)

(58) Field of Classification Search
CPC .. G06T 11/60; G06F 17/248; G06F 17/30247
See application file for complete search history.

(56) References Cited

U.S. PATENT DOCUMENTS

| | | | | |
|---|---|---|---|---|
| 6,026,433 | A * | 2/2000 | D'Arlach | G06F 17/24 707/999.01 |
| 6,707,573 | B1 * | 3/2004 | Ito | H04N 1/6052 358/1.9 |
| 7,262,778 | B1 * | 8/2007 | Edwards | G06Q 30/02 345/589 |
| 7,657,835 | B2 * | 2/2010 | Mindrum | G06Q 10/10 715/719 |
| 2004/0183830 | A1 * | 9/2004 | Cody | G06Q 10/107 715/747 |
| 2005/0254092 | A1 * | 11/2005 | Lee | G06F 17/248 358/1.18 |
| 2005/0268227 | A1 * | 12/2005 | Carlson | G06F 17/248 715/223 |
| 2006/0181736 | A1 * | 8/2006 | Quek | G03D 15/005 358/1.18 |
| 2007/0079236 | A1 * | 4/2007 | Schrier | G06F 17/217 715/206 |
| 2008/0104082 | A1 * | 5/2008 | Gimson | G06F 17/248 |
| 2008/0104508 | A1 * | 5/2008 | Lumley | G06F 17/248 715/255 |
| 2009/0016605 | A1 * | 1/2009 | Chao | G06K 9/00442 382/176 |
| 2010/0073396 | A1 * | 3/2010 | Wang | H04N 1/00132 345/591 |
| 2010/0150437 | A1 * | 6/2010 | Morales | H04N 1/00132 382/167 |
| 2010/0318899 | A1 * | 12/2010 | Kitada | H04N 1/6013 715/243 |
| 2011/0029914 | A1 * | 2/2011 | Whitby | G06T 11/60 715/781 |
| 2012/0047425 | A1 * | 2/2012 | Ahmed | G06F 17/30905 715/234 |
| 2013/0004073 | A1 * | 1/2013 | Yamaji | G06T 11/60 382/173 |
| 2014/0015846 | A1 * | 1/2014 | Campbell | G06F 3/147 345/589 |
| 2014/0046980 | A1 * | 2/2014 | Kleinschmidt | G06F 17/30896 707/793 |
| 2016/0082348 | A1 * | 3/2016 | Kehoe | G06Q 10/101 463/31 |

OTHER PUBLICATIONS

Themeforest.net/forums, Oct. 2, 2010, pp. 1-4 http://themeforest.net/forums/thread/why-doesnt-anyone-create-matching-website-email-templates/32448.*

* cited by examiner

*Primary Examiner* — Scott Baderman
*Assistant Examiner* — Mario M Velez-Lopez
(74) *Attorney, Agent, or Firm* — James M. Smedley LLC; James Michael Smedley, Esq.

(57) ABSTRACT

The present invention relates to the field of graphic design. Specifically, embodiments of the present invention provide a system and method of generating a design template, such as a website template, that matches the color and style of graphical content, such as a logo provided to the system.

10 Claims, 7 Drawing Sheets

SYSTEM AND METHOD FOR GENERATING A DESIGN TEMPLATE BASED ON GRAPHICAL INPUT

FIELD OF THE INVENTION

The present invention relates to the field of graphic design. Specifically, embodiments of the present invention provide a system and method of generating a design template, such as a website template, that matches the color and style of graphical content (e.g., logo) provided to the system.

BACKGROUND

Website builders, Content Management Systems, and E-mail Marketing Systems have become highly popular as a means of creating websites and e-mails from a selection of customizable pre-defined designs, often referred to as themes or templates.

There are certain recognized principles of designing attractive, easy-to-navigate websites that provide a clear message to viewers. These principles include consistency of theme, clear organization, attractive color scheme and layout, and distinctive branding. In order to uphold these principles, users of such software must carefully select design elements that are consistent with an organization's brand throughout the site, and avoid elements that distract from the brand and intended message. Further, users should ensure that color or other visual elements match well with every other color and/or visual element utilized in the design. The entire process can be complex and the matching and mating process of color and design elements can be difficult to effect perfectly. Inexperienced users can easily overlook design principles and mate inappropriate design elements and colors, resulting in visual disharmony and distraction for a visitor to the website.

There is therefore a need in the art for a system and method that streamlines automated design template generation, allowing for users to create customized designs and design templates for websites based on sound design principles. Improved designs, reduced implementation time, reduced costs and other features and advantages of the present invention will be explained and will become obvious to one skilled in the art through the summary of the invention that follows.

SUMMARY OF THE INVENTION

Accordingly, it is an aspect of the present invention to provide a system and method that provides automated design template generation, allowing users to create customized designs and design templates for websites using sound design principles. Embodiments of the present invention may utilize graphical content associated with the user in order to determine appropriate color schemes and design elements for utilization in the generation of such design templates.

According to an embodiment of the present invention, a system provides a computer application for building a website based on the design elements of a logo. The application prompts a user to submit a logo, such as a company or organizational logo, in the form of an electronic image file. Once the application receives the logo image, it automatically analyzes the logo image to identify characteristic design elements, including style, pixel configuration, strokes, transparency, fonts, and color. The application then accesses a database of predesigned themed website templates and selects the template that best matches the design characteristics of the logo. Additional style elements and color are applied to the selected website template consistent with the design elements of the logo.

The logo can be automatically modified, as needed, for insertion into the selected website. Modifications may include cropping, resizing, resampling, adjusting pixel density, or touching up the logo. The logo is then inserted into the design. Each template is presented to the user as a preview with the logo embedded therein and style elements and color automatically applied consistent with the design elements of the logo.

Once a template is selected, the user is able to customize the template by altering website elements in a desired configuration. A "live preview" function allows a user to preview their design before launch. As a user customizes the selected template, the preview is automatically updated to reflect the changes.

According to an embodiment of the present invention, the entire process may also be used for generating designs used for e-mails.

According to another embodiment of the present invention, a computer-implemented method for designing a website is provided. The method includes the steps of: receiving graphical content from a user, such as a logo; identifying characteristic design elements of the graphical content, where the characteristic design elements are selected from the group comprising style elements, pixel count, configuration, strokes, lines, objects, fonts, transparency, and colors; accessing a database of predesigned design templates; determining a plurality of tailored style elements for the one or more selected design templates, where the tailored style elements are selected from the group comprising, a primary color, a secondary color, color harmonies, complementary colors and a color palette; applying the plurality of tailored style elements to the one or more design templates that are consistent with the characteristic design elements of the graphical content; modifying the graphical content for insertion into the one or more selected design templates by doing one or more of the following: cropping, resizing, resampling, adjusting pixel density, or touching up the graphical content; inserting the graphical content into the one or more selected design templates; and providing the one or more selected design templates to a user.

According to an embodiment of the present invention, a user is able to browse the database of predesigned design templates and select a design template that is different from the one or more automatically selected design templates. The user can thus reject the system selected design template in favor of a design template chosen by the user.

According to an embodiment of the present invention, the one or more user selected design templates may be modified by the system to incorporate additional matching style elements, just as it would do for a system selected template before presenting the finished templates to the user.

According to a further embodiment of the present invention, the one or more selected design templates may be ranked according to how closely they match the characteristic design elements of the graphical content.

According to a further embodiment of the present invention, each of said selected design templates comprise one or more of the following: HTML, XHTML, XML, Cascading Style Sheets (CSS), images, JavaScript, other multimedia, and a set of configuration options for customizing the template.

According to an embodiment of the present invention, the method may be further applied to generating appropriately styled and themed e-mails that match the user's logo or other graphical content.

According to a further embodiment of the present invention, a computer-implemented system is provided for generating a design template. The system includes: a graphical content analysis module, having computer-executable code stored in non-volatile memory, a design template generation module, having computer-executable code stored in non-volatile memory, a processor, and a communication means, where the graphical content analysis module, the design template generation module, the processor and the communications means are operably connected and are configured to: receive graphical content; identify characteristic design elements of the graphical content, where the characteristic design elements are selected from the group comprising style elements, pixel count, configuration, strokes, lines, objects, transparency, fonts, and colors; access a database of predesigned design templates and select one or more design templates that most closely match the characteristic design elements of the graphical content; determine a plurality of tailored style elements for the one or more selected design templates, where the tailored style elements are selected from the group comprising, a primary color, a secondary color, color harmonies, complementary colors and a color palette; apply the plurality of tailored style elements to the one or more design templates that are consistent with the characteristic design elements of the graphical content; modify the graphical content for insertion into the one or more selected design templates by doing one or more of the following: cropping, resizing, resampling, adjusting pixel density, or touching up the graphical content; insert the graphical content into the one or more selected design templates; and provide the design templates to a user for selection; and allow for further customization by a user.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention relates to the field of graphic design. Specifically, embodiments of the present invention provide a system and method of generating a design template, such as a website template, that matches the color scheme and style of graphical content such as a company logo provided to the system.

Figure 1:
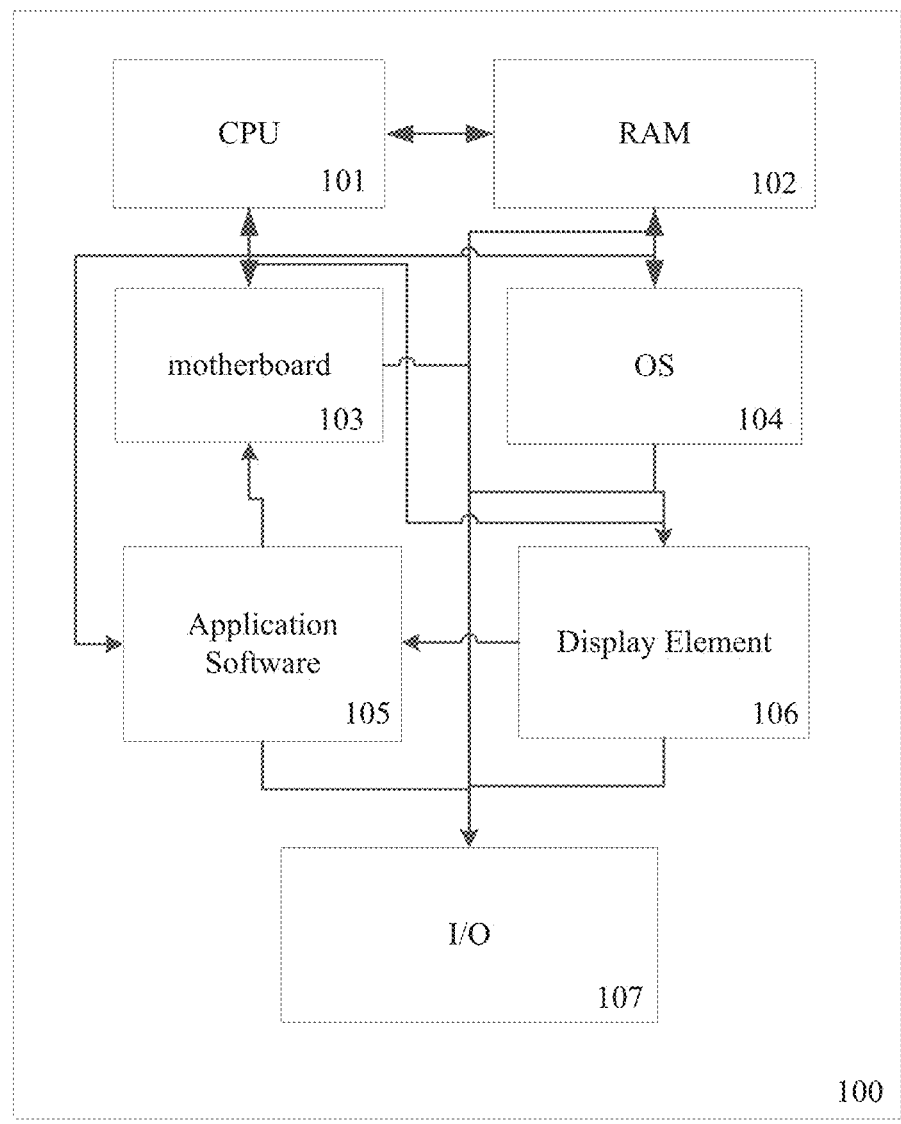
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
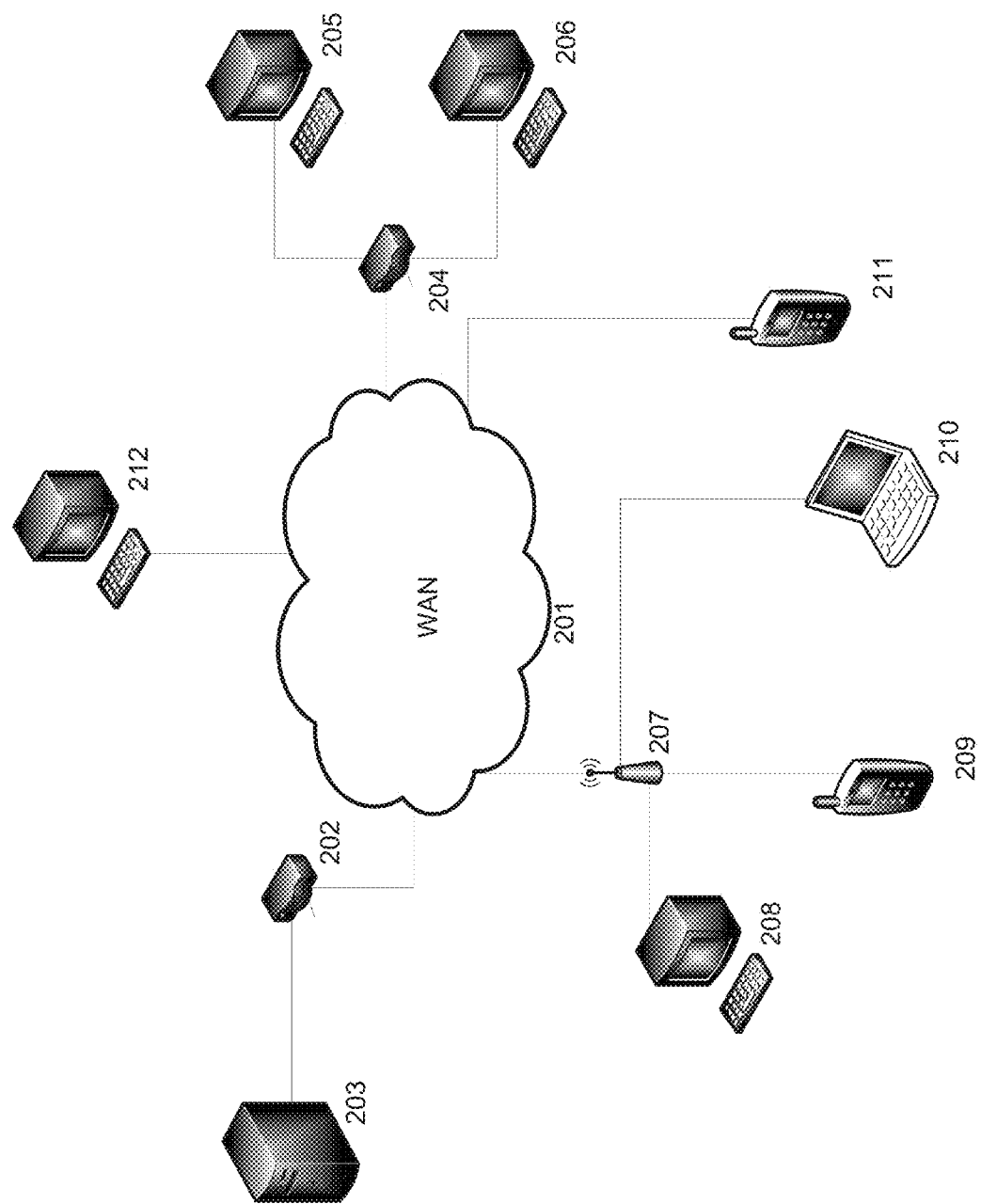
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

Figure 3A:
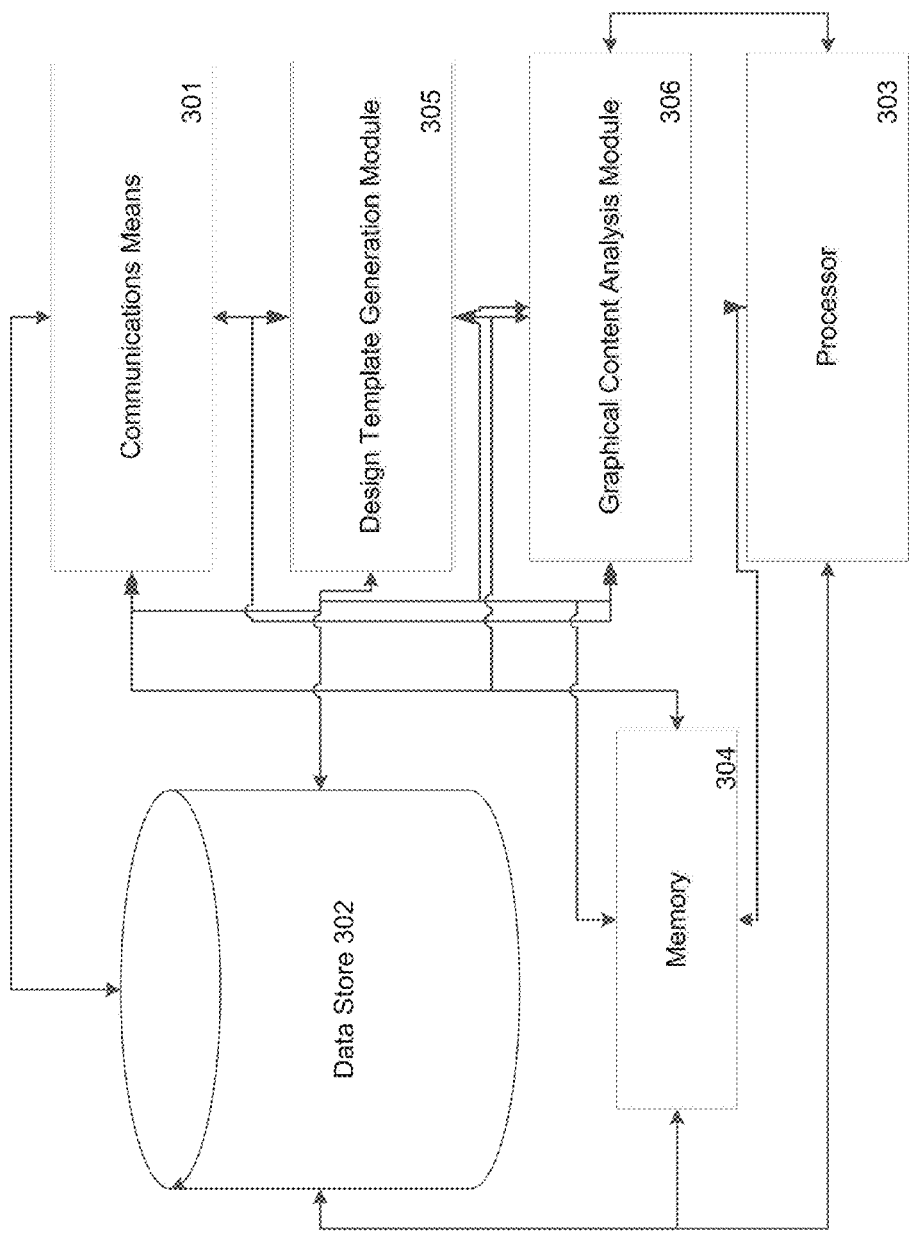
FIG. 3A illustrates a schematic of a system for generating a design template, in accordance with an embodiment of the present invention.
Figure 3B:
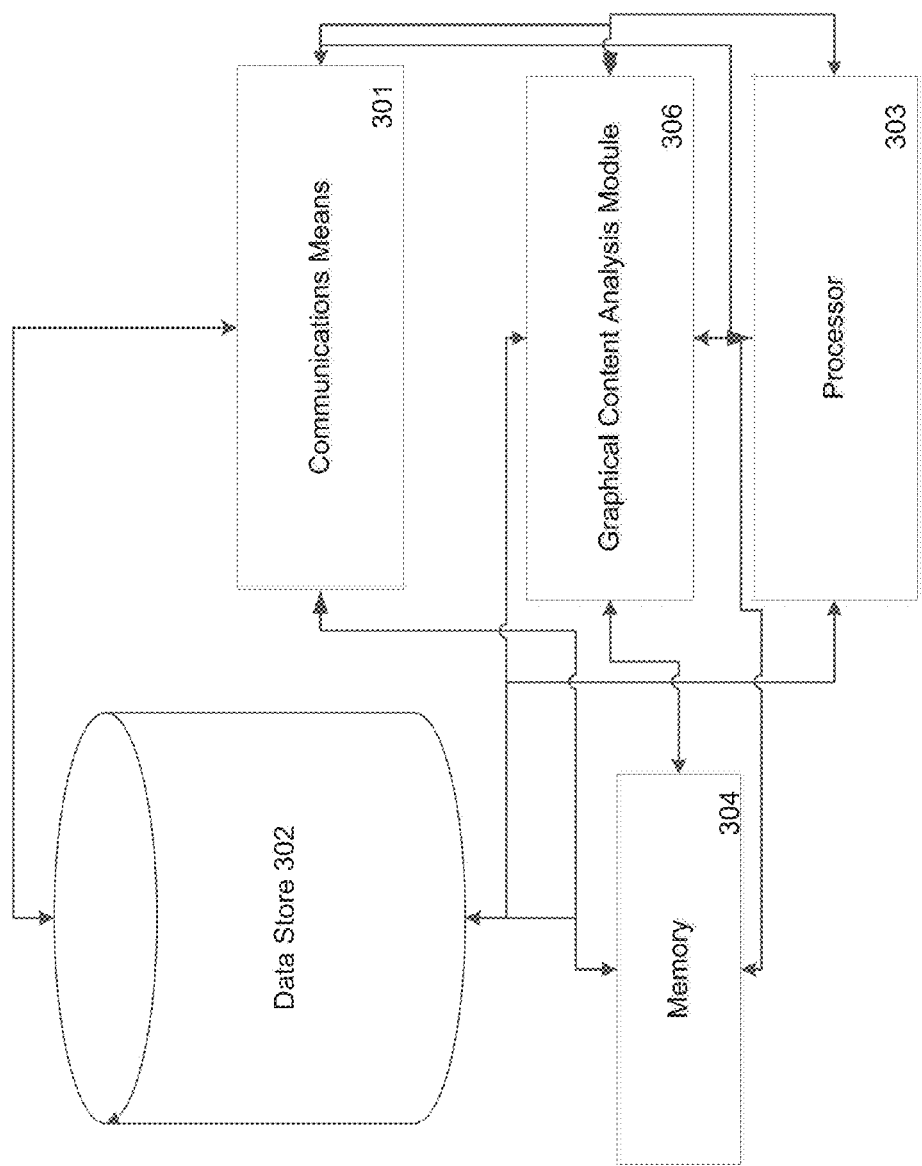
FIG. 3B illustrates a schematic of a system for generating a design template, in accordance with an embodiment of the present invention.
Figure 3C:
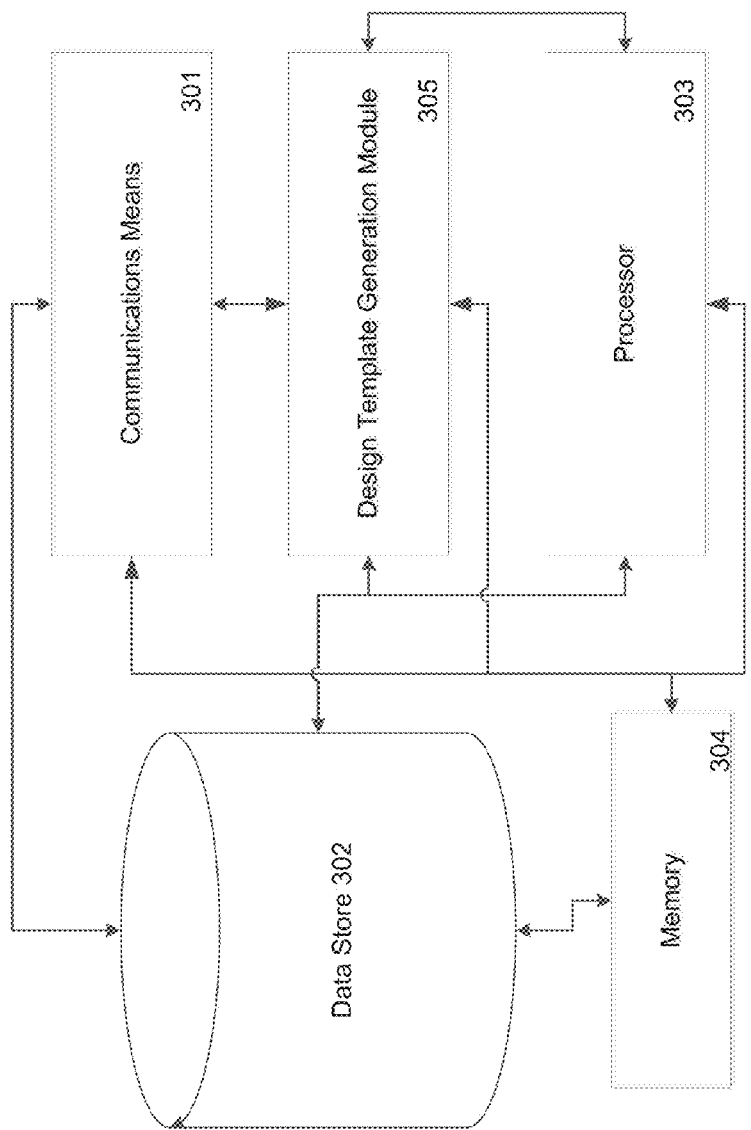
FIG. 3C illustrates a schematic of a system for generating a design template, in accordance with an embodiment of the present invention.

Turning to FIG. 3A, according to an embodiment of the present invention, a system for generating design templates is comprised of one or more communications means 301, one or more data stores 302, a processor 303, memory 304, a design template generation module 305 and a graphical content analysis module 306. In FIG. 3B, according to an embodiment of the present invention, a system for generating design templates is comprised of one or more communications means 301, one or more data stores 302, a processor 303, memory 304 and an graphical content analysis module 306. In FIG. 3C, according to an embodiment of the present invention, a system for generating design templates is comprised of one or more communications means 301, one or more data stores 302, a processor 303, memory 304 and a design template generation module 305. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data over one or more networks or to one or more peripheral devices attached to the system. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the graphical content analysis module is configured to receive graphical content from a user, generally via a communications means providing data across one or more networks. The received graphical content is processed by the graphical content analysis module for the purpose of identifying and extracting design elements and characteristics associated with the graphical content. In a preferred embodiment, the purpose of identifying and extracting the characteristic design elements is to utilize those design elements to generate a design template matching or assimilating those design elements. For purposes of this application, a design template may include a website, blog, micro-blog, social media site, web-enabled application, or internet portal.

According to an embodiment of the present invention, the graphical content received may be graphical content of any type, including, but not limited to, a logo, an image, a picture, a stylized design or any combination thereof. One of ordinary skill in the art will appreciate that graphical content may also include a company logo, trade dress, product packaging, audio/visual elements, or other identifying indicia associated with a brand or business. Graphical content may be received in numerous formats, including, but not limited to, raster formats (e.g., PNG, GIF, JPG), vector formats (e.g., AI, PNG, EPS, SVG), 3D formats (e.g., CAD files) or any combination thereof. One of ordinary skill in the art would appreciate that there are numerous types and formats of graphical content that could be received and utilized by the system, and embodiments of the present invention are contemplated for use with any type and format of graphical content.

According to an embodiment of the present invention, the graphical content analysis module may be configured to pre-process the graphical content prior to analyzing the graphical content for characteristic design elements. Pre-processing of the graphical content may include, but is not limited to, cropping, resizing, changing pixel density, removal of backgrounds, removal of layers, removal of artefacts, or any combination thereof. One of ordinary skill in the art would appreciate that there are numerous types of pre-processing that could be utilized by the system, and embodiments of the present invention are contemplated for use with any form and type of graphical content pre-processing.

According to an embodiment of the present invention, the graphical content analysis module is configured to analyze the graphical content in order to identify the characteristic design elements. Analysis of the graphical content may include, but is not limited to, (i) processing pixels of the graphical content in order to determine a set of colors found in the graphical content and the prevalence of each color, (ii) processing of strokes in the graphical content in order to determine a set of colors found in the graphical content and the prevalence of each color, (iii) processing of lines, rays, layers, textures, patterns, objects or other graphical elements (such as by way of edge analysis) in order to identify or determine usage of design features/elements (e.g., sharp lines, rounded edges, smoothness, grittiness, sharpness, fading, glow, shadows), or (iv) any combination thereof.

Once analysis of the graphical content is completed, the graphical content analysis module may be configured to generate a set of characteristic design elements. Characteristic design elements include, but are not limited to, a primary color, a secondary color, a color palette, design features, design elements, lighting preferences, transparency preferences, sharpness preferences, blending preferences, pixel density preferences or any combination thereof. One of ordinary skill in the art would appreciate that there are numerous types of characteristic design elements that could be utilized with embodiments of the present invention and embodiments of the present invention are contemplated for use with any type of characteristic design elements.

According to an embodiment of the present invention, a design template generation module is configured to receive the set of characteristic design elements from the graphical content analysis module for the purpose of generating one or more design templates which integrate at least a portion of the characteristic design elements. In a preferred embodiment, the design template generation module is configured to retrieve predesigned design templates from a database, data store or other storage medium and select one or more predesigned design templates based on the characteristic design elements. Each stored design template may include, but is not limited to, Hypertext Markup Language (HTML), Cascading Style Sheets (CSS), images, multimedia content, configuration options, customization options, executable code (e.g., JavaScript, PHP, Ruby, Ruby on Rails, ASP.net), or any combination thereof. One of ordinary skill in the art would appreciate that there are numerous types of content that may be stored in association with a stored design template, and embodiments of the present invention are contemplated for use with any type of content.

The design template generation module is further configured to select a design template based on the characteristic design elements of the graphical content processed by the graphical content analysis module. More specifically, the design template generation identifies one or more design templates that best match the characteristic design elements of the user provided graphical content.

According to an embodiment of the present invention, in addition to selecting one or more design templates, the design template generation module will process the characteristic design elements into a set of tailored style elements for utilization in personalizing or otherwise altering the selected design templates to more closely match the characteristic design elements of the graphical content. Tailored style elements include, but are not limited to, a primary color, a secondary color, a color palette, design features, design elements, shading modifications, lighting modifications, transparency modifications, sharpness modifications, blending modifications, pixel density or any combination thereof. One of ordinary skill in the art would appreciate that there are numerous types of tailored style elements that could be utilized with embodiments of the present invention and embodiments of the present invention are contemplated for use with any type of tailored style elements.

According to an embodiment of the present invention, the design template generation module is further configured to apply the set of tailored style elements to the one or more selected design templates in order to alter the original selected design template to further match those design elements contained in the set of tailored style elements. Application of the tailored style elements to the selected design templates may modify one or more of the aspects noted above associated with the stored design. Modifications may include, but are not limited to, modifying HTML, modifying CSS, modifying images, modifying multimedia content, modifying configuration options, modifying customization options, modifying executable code, or any combination thereof. The result is one or more selected design templates that approximate the look and feel of the graphical content provided by the user or otherwise provide a template that allows for aesthetically pleasing inclusion of the graphical content in the modified design template.

Exemplary Embodiment

Figure 4:
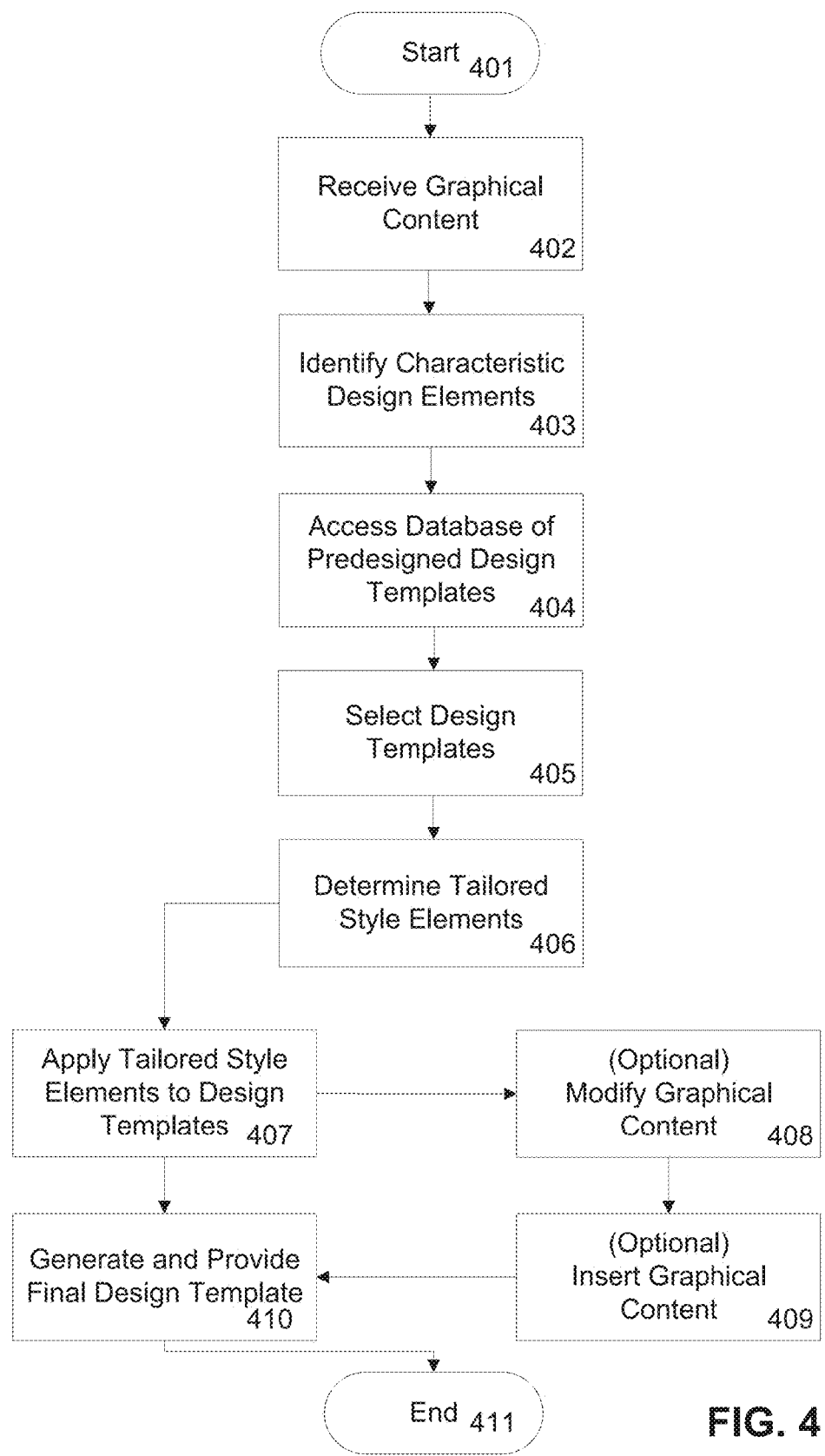
FIG. 4 is a process flow of an exemplary method in accordance with embodiments of the present invention.

Turning now to FIG. 4, an exemplary embodiment of the present invention is shown. The process starts at step 401 with a user requesting to start the process for receiving a customized design template. At step 402, the system receives graphical content from the user, generally via a communication means attached to one or more networks or other devices.

At step 403, the system processes the graphical content and identifies the relevant characteristic design elements contained in the graphical content. As described herein, the graphical content may be pre-processed in order to improve the ability of the system to recognize the characteristic design elements.

At step 404, the system accesses a database or other data store or storage medium in order to retrieve predesigned design templates that contain or otherwise match or approximate the characteristic design elements identified. In conjunction with step 404, the system may select one or more predesigned design templates that most closely match the characteristic design elements (step 405).

At step 406, the system determines tailored style elements from the characteristic design elements associated with the graphic content. The generation of a set of tailored style elements will be generated through analysis of the characteristic design elements as previously discussed herein.

At step 407, the system applies the tailored style elements to one or more selected design templates in order to match the look and feel of the graphical content provided by the user. The system may then generate and provide the final design template to the user (step 410) at which point the process ends at step 411. Alternatively, and optionally, after application of the tailored style elements to the selected design templates, the system may modify the graphical content to match or otherwise fit into the tailored design templates (step 408) and place the graphical content into one or more of the tailored design templates (step 409). At this point, the system would generate and finalize the final design templates and provide them to the user (step 410), with the process terminating at step 411.

Figure 5:
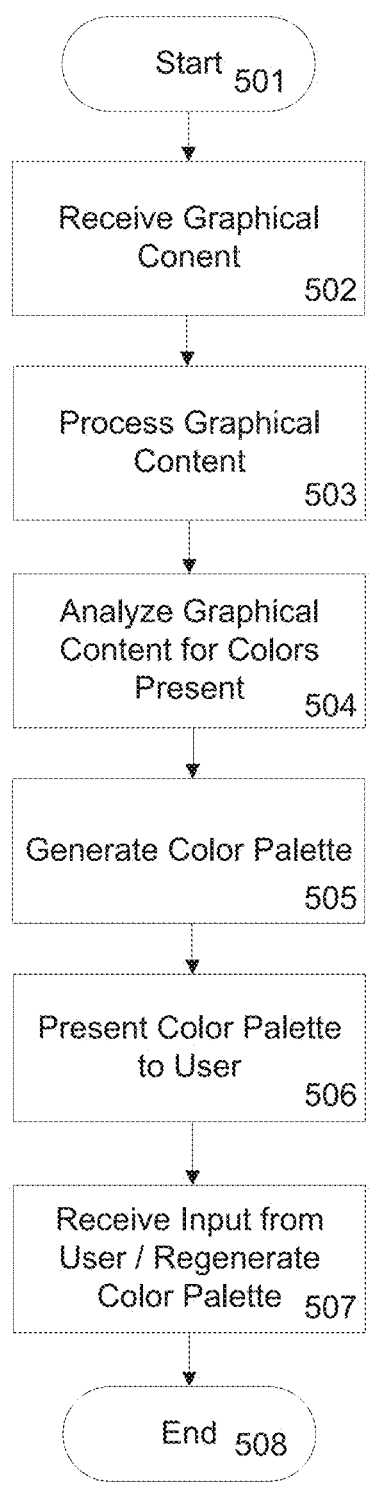
FIG. 5 is a process flow of an exemplary method in accordance with embodiments of the present invention.

Turning now to FIG. 5, a second exemplary embodiment of the present invention is shown. The process starts at step 501 with the system beginning the method of processing graphical content for use in a design template. At step 502, the system receives graphical content, generally via a communication means or from another component of the system.

At step 503, the system processes the graphical content in order to maximize the ability of the system to later extract characteristic design elements. Processing of the graphical content at this step may include pre-processing of the graphical content, such as through cropping, resizing, changing pixel density, removal of backgrounds, removal of layers, removal of artefacts, or any combination thereof.

At step 504, the system analyzes the color contents of the graphical content. As described above, this may include determining the set of colors used in the graphical content and the frequency of the colors used. Further, the colors may be aligned on a spectrum such that like colors are grouped and weighted similarly to determine main and secondary colors.

At step 505, the system uses the color sets to generate one or more color palettes that complement the colors used in the graphical content. These color palettes may be later used in the set of tailored style elements and in the generation of one or more tailored design templates.

At step 506, the system may be configured to present the color palette(s) to the user for review. At this point, the user can confirm or reject certain color palettes or otherwise tweak the color palettes for their own purposes. Advantageously, if a user tweaks a color palette, the system may be later configured to reprocess the graphical content with the color palette selected by the user (such as in optional steps 408-409 in FIG. 4).

At step 507, the system receives input from the user on the color palettes and regenerates the color palettes accordingly. At this point, the process terminates at step 508.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer-implemented method for designing a website, the method comprising the steps of:
   receiving vector-based or rasterized vector-based graphical content;
   identifying characteristic design elements of said graphical content, said characteristic design elements selected from the group comprising style elements, configuration, strokes, lines, and colors;
   accessing a database to retrieve one or more predesigned markup language design templates wherein each of said selected markup language design templates comprise one or more of the following: HTML, XHML, XML, Cascading Style Sheets (CSS), images, other multimedia, and a set of configuration options for customizing the template;
   applying characteristic design elements of said graphical content to one or more of said one or more predesigned markup language design templates;
   determining a plurality of tailored style elements for said one or more selected markup language design templates, wherein said tailored style elements are selected from the group comprising, a primary color, a secondary color and a color palette;
   applying said plurality of tailored style elements to the one or more markup language design templates that are consistent with the characteristic design elements of said graphical content;
   modifying the graphical content for insertion into the one or more selected markup language design templates by doing one or more of the following: resampling, adjusting pixel density, or touching up said graphical content;
   inserting said graphical content into the one or more selected markup language design templates; and
   providing said one or more selected markup language design templates to a user.

2. The method of claim 1, wherein a user is able to browse said database of predesigned markup language design templates and select a user selected markup language design template that is different from the one or more selected markup language design templates.

3. The method of claim 2, wherein said user selected markup language design template is modified through application of said plurality of style elements prior to being provided to said user.

4. The method of claim 1, wherein the one or more selected markup language design templates are ranked according to how closely they match the characteristic design elements of said graphical content.

5. The method of claim 1, further comprising the step of generating a style, layout, and color scheme for e-mails associated with said selected markup language design template based on said characteristic design elements.

6. A computer-implemented system for generating a markup language design template, the system comprising:
   a graphical content analysis module, comprising computer-executable code stored in non-volatile memory,
   a design template generation module, comprising computer-executable code stored in non-volatile memory,
   a processor, and
   a communication means,
   wherein said graphical content analysis module, said design template generation module, said processor and said communications means are operably connected and are configured to:
   receive vector-based or rasterized vector-based graphical content;
   identify characteristic design elements of said graphical content, said characteristic design elements selected from the group comprising style elements, configuration, strokes, lines, and colors;

access a database of predesigned markup language design templates to retrieve one or more predesigned markup language design templates wherein each of said selected markup language design templates comprise one or more of the following: HTML, XHML, XML, Cascading Style Sheets (CSS), images, other multimedia, and a set of configuration options for customizing the template;

apply characteristic design elements of said graphical content to one or more of said one or more predesigned markup language design templates;

determine a plurality of tailored style elements for said one or more selected markup language design templates, wherein said tailored style elements are selected from the group comprising, a primary color, a secondary color and a color palette;

apply said plurality of tailored style elements to the one or more markup language design templates that are consistent with the characteristic design elements of said graphical content;

modify the graphical content for insertion into the one or more selected markup language design templates by doing one or more of the following: resampling, adjusting pixel density, or touching up said graphical content;

insert said graphical content into the one or more selected markup language design templates; and provide said one or more selected markup language design templates to a user.

7. The system of claim 6, wherein a user is able to browse said database of predesigned markup language design templates and select a user selected design template that is different from the one or more selected markup language design templates.

8. The system of claim 7, wherein said user selected markup language design template is modified through application of said plurality of style elements prior to being provided to said user.

9. The system of claim 6, wherein the one or more selected markup language design templates are ranked according to how closely they match the characteristic design elements of said graphical content.

10. The system of claim 6, further comprising the step of generating a style, layout, and color scheme for e-mails associated with said selected markup language design template based on said characteristic design elements.

* * * * *